June 12, 1923.

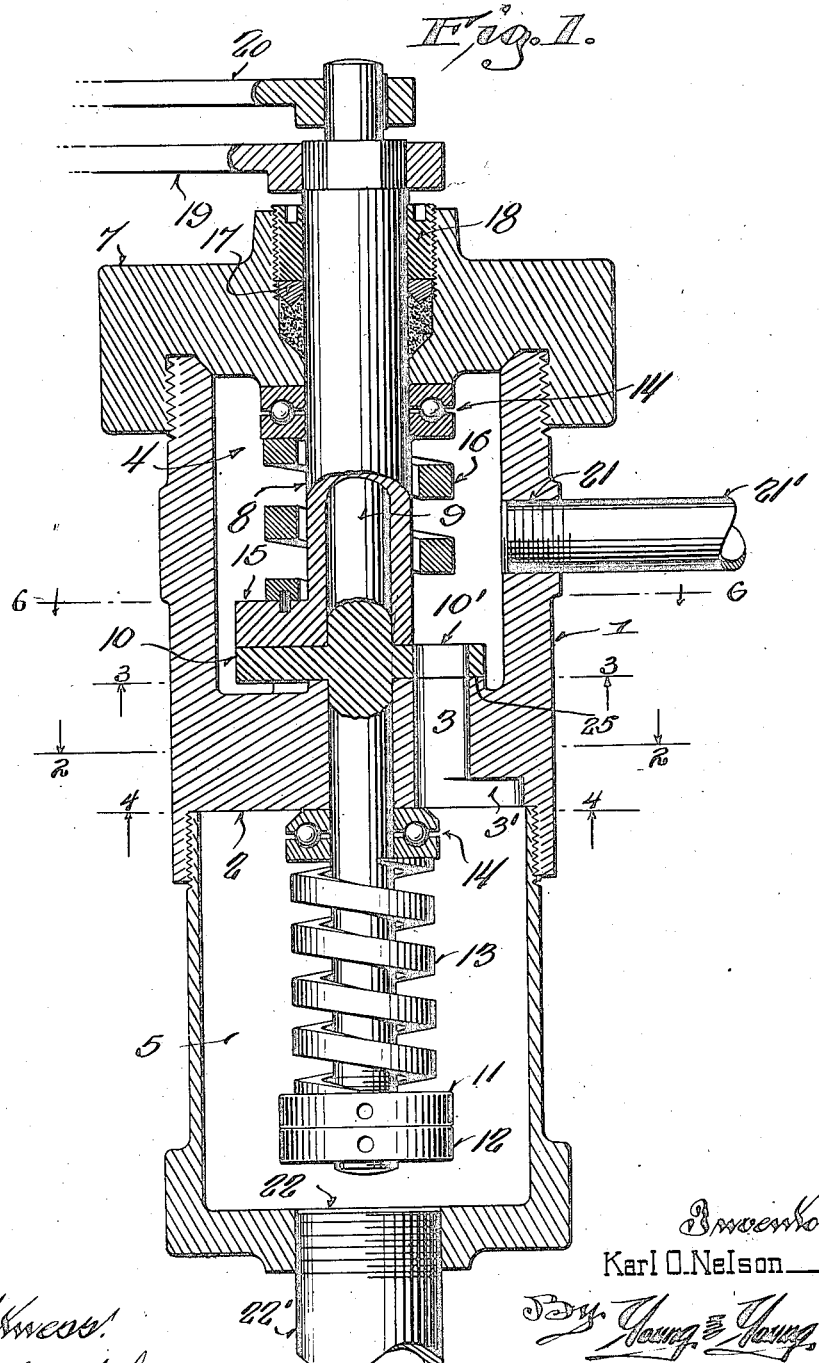

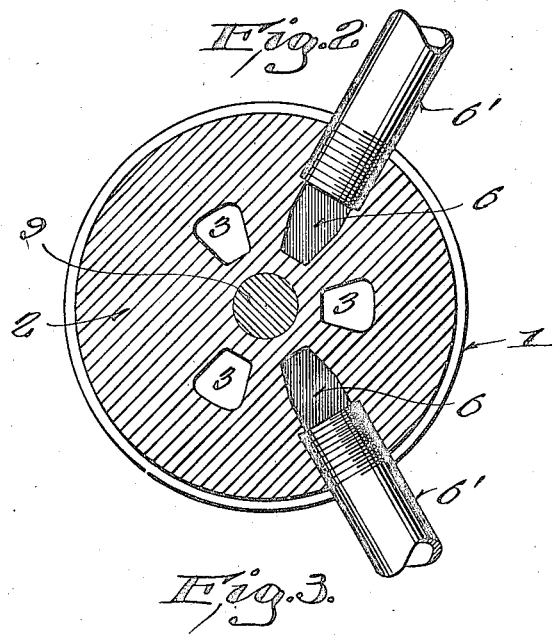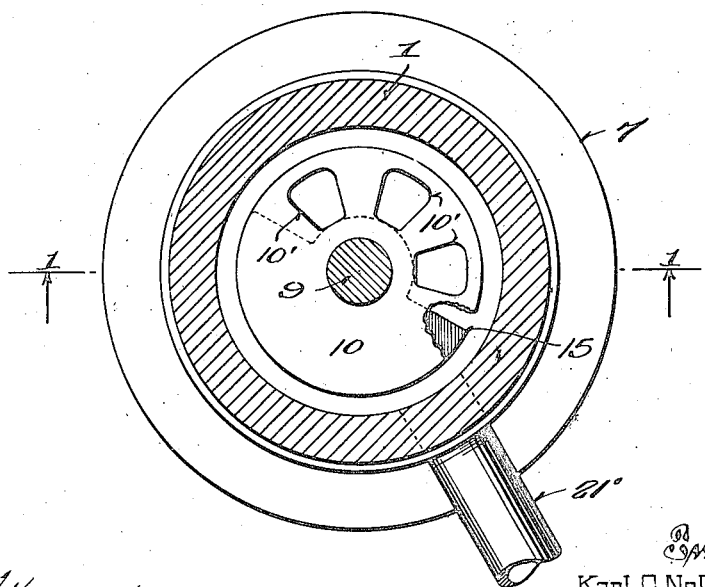

K. O. NELSON

VALVE

Filed Feb. 14, 1921

Karl O. Nelson

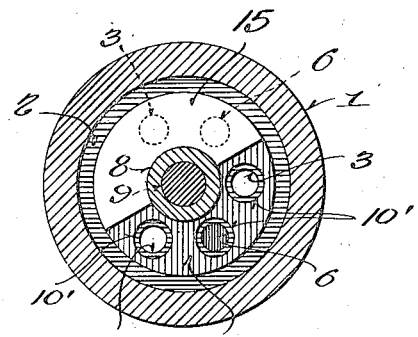
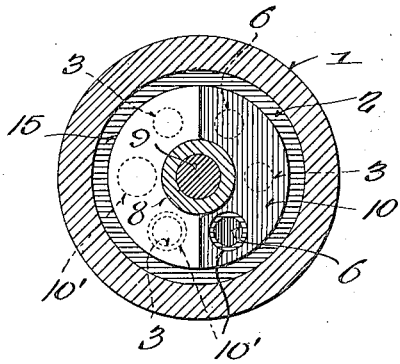
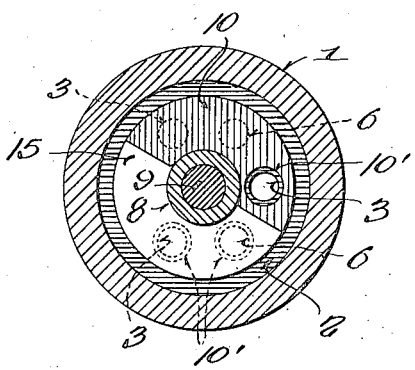

Patented June 12, 1923.

1,458,355

UNITED STATES PATENT OFFICE.

KARL O. NELSON, OF MILWAUKEE, WISCONSIN.

VALVE.

Application filed February 14, 1921. Serial No. 444,925.

*To all whom it may concern:*

Be it known that I, KARL O. NELSON, a citizen of the United States, and resident of Milwaukee, in the county of Milwaukee and State of Wisconsin, have invented certain new and useful Improvements in Valves; and I do hereby declare that the following is a full, clear, and exact description thereof.

My invention relates to valves, and more particularly to that type adapted to be used in connection with hydraulic pressure devices, for controlling the pressure fluid.

The primary object of my invention resides in the provision of a valve of this character which is simple in construction and durable, rapid and efficient in operation.

Another object is to provide a valve of this character in which the pressure is equalized upon both sides of the valve to the extent of rendering it easy to manipulate.

A further object lies in the provision of means whereby a valve of this character is adapted to hold against a predetermined pressure and release itself at a greater pressure, thereby acting as a safety valve and relieving strain upon the associated mechanism and piping.

A still further object resides in the specific construction of the valve for controlling the pressure fluid.

With these and other objects in view, which will be apparent as the description proceeds, my invention resides in the novel features and combination of parts which will be more particularly pointed out and defined in the appended claims.

In the drawings:

Figure 1 is a vertical sectional view through the valve casing with parts broken away and in section, to more clearly illustrate the invention.

Figure 2 is a transverse sectional plan view taken upon the line 2—2 of Figure 1.

Figure 3 is a transverse sectional view looking up upon the line 3—3 of Figure 1.

Figures 6, 7 and 8 are transverse sections taken upon the line 6—6 of Figure 1, showing the valve in its various positions.

Figure 4:
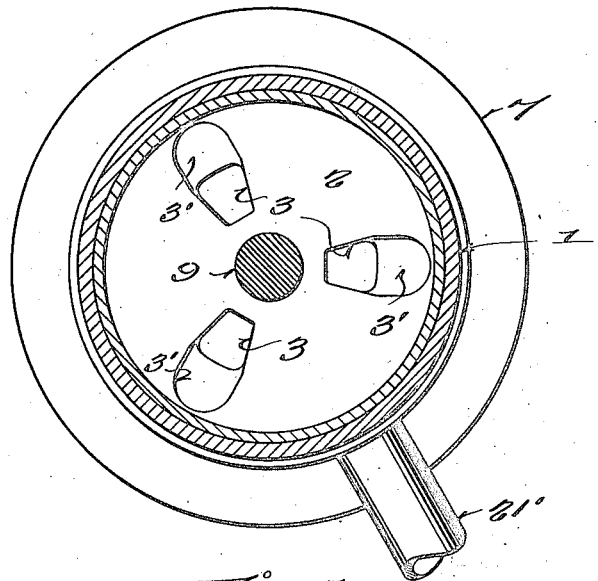
Figure 4 is a transverse sectional view taken upon the line 4—4 of Figure 1.
Figure 5:
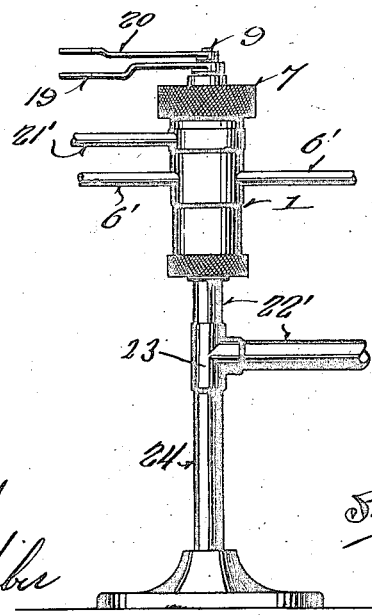
Figure 5 is an elevational view of the valve and its support.

Referring now more particularly to the accompanying drawings, the numeral 1 designates a valve casing which, for the purpose of manufacturing and assembling, is preferably made in two parts, threaded or otherwise secured together. Intermediate the ends of the casing is a partition 2, provided with a plurality of by-pass ports 3 connecting the upper and lower chambers 4 and 5 respectively, and the outlet ports 6 which communicate with the chamber 4 and are connected to pressure cylinders (not shown), by means of pipes 6'. It will be noted that the ports 3 are slightly flared at 3' in order to prevent their restriction by the ball race 14.

The upper end of the casing has threaded thereon, a head 7, in which is journaled a sleeve 8. Journaled within the sleeve and also having a bearing in the partition 2 is a valve stem 9, provided with a valve plate 10, having openings 10' adapted to register selectively, upon oscillation of the valve stem, with the desired ports formed in the partition 2. The lower portion of the valve stem 9, extends into the chamber 5 and has threaded upon its lower end an adjustment nut 11 and a jam or lock nut 12.

A compression spring 13 is mounted upon the valve stem between the adjustment nut 11 and partition to normally urge the valve plate 10 upon its seat, while disposed between the spring and partition is a ball race 14, for the purpose of eliminating friction between these two members.

Extending from the lower part of the sleeve 8 and adapted to seat upon the upper surface of the valve plate 10, is a cut-off 15, comprising a sector adapted to form a closure for the openings 10' in the valve plate 10 and also to provide a seat for the spring 16 surrounding the sleeve 8. Disposed between the spring 16 and head 7, is an antifrictional bearing 14' which further eliminates friction upon operation of the valve.

The head 7 is provided with a stuffing gland 17 and retaining nut 18, to prevent leakage of oil around the sleeve. For the purpose of oscillating the sleeve 8, its upper end is provided with a hexagonal head upon which is mounted a lever 19, while a lever 20 is keyed to that end of the valve stem 9 extending above the sleeve. While it has not been shown, it will be readily appreciated that a detent for the levers 19 and 20 can be provided having indications thereon to show the position of the valve plate 10 and the cut-off, thereby enabling the operator to selectively open or close any one or combination of ports desired.

Communicating with the chamber 4, the valve casing is provided with a fluid pressure inlet port 21 into which is threaded a pipe 21′ communicating with a pump or other means (not shown), for supplying fluid under pressure, while the chamber 5 is provided with a fluid return port 22 of a considerable greater diameter than the inlet port 21. Threaded into the return port 22 is a return pipe 22′ having threaded thereon a T-fitting 23 which allows the valve casing to be mounted upon a standard 24.

As illustrated in Figure 1, the partition 2 is provided with a valve seat 25, which projects above the partition and surrounds the ports 3 and 6, thus serving to space the valve plate 10 slightly above the partition to permit the pressure fluid to act against a portion of its underside, thereby reducing the fricion and bind between the valve and its seat to a minimum.

Taking up the operation of the valve, particular attention is directed to Figures 6, 7 and 8, illustrating the relative positions of the valve plate and cut off in their various operative positions.

Figure 7 illustrates the valve plate and cut off in that position providing for a communication between the pressure supply and one of the ports 6, which position allows the cylinder communicating with the exposed port to become filled with pressure fluid.

Figure 8 illustrates that position of the valve in which the pressure is being held or maintained in the cylinder, the port 6, which was open in the filling position of the valve, now being closed, and one of the by-pass ports 3 being opened to provide a communication between the pressure fluid entering the port 21, and the chamber 5 communicating with the return line 22′.

Figure 6 shows the parts of the valve so arranged as to provide a communication between the chamber 4, and two of the by-pass ports 3, and one of the outlet ports 6. In this position of the valve, the cylinder communicating with the port 6 is allowed to exhaust, as hereinafter described; while the pressure fluid entering the chamber 4 thru the supply pipe 21, merely passes thru the by-pass port 3 into the chamber 5 and thence to the return line 22′.

Attention is directed to the fact that the spring 16 is designed to hold the valve mechanism upon its seat, against a predetermined pressure built up in the cylinders. Should this pressure become sufficiently great, the same will overcome the tension of the spring, thereby lifting the valve and permitting the fluid to enter the chamber 4 from which it will pass thru the by-pass ports into the chamber 5 and return line 22′, thereby relieving pressure in the cylinder and eliminating danger to the associated piping and mechanism.

Tracing the action of the pressure fluid entering the port 21, it will be apparent that, as the valve plate 10 and cut-off 15 are oscillated to the position shown in Figure 7, the pressure fluid will pass from the chamber 4 thru port 6 which is open, and from thence to the cylinder thru the pipe 6′. When the desired pressure is attained in the cylinder, and it is desired to maintain this pressure, the valve plate and cut-off are maintained in their same relative position and simultaneously oscillated to close the port 6, thereby cutting off the cylinder from the pressure fluid supply, thus maintaining the pressure already created in the cylinder. In this position of the valve, there must naturally be some means for taking care of the pressure fluid. Therefore the opening 10′, which registered with the port 6 during the filling operation of the cylinder, is now arranged to register with one of the by-pass ports 3, allowing the pressure fluid to pass from the chamber 4 into the chamber 5, and from thence to the return line 22.

When it is desired to relieve the pressure maintained in the cylinder, as above described, the valve plate is oscillated to the position shown in Figure 6, thereby opening two of the by-pass ports 3 and one of the ports 6, while the cut-off 15 is oscillated to a position, wherein the ports 10′ in the valve plate are all open. In this position, a communication is formed between the cylinder and the chamber 5. However, due to the fact that two of the by-pass ports are opened, at the same time, a communication is also provided between the pressure fluid supply and the return line thru the by-pass ports 3. Due to the foregoing, the fluid pressure entering the chamber 4 thru the inlet 21, will pass thru one of the by-pass ports 3, which is of sufficient diameter to compensate for the supply. This relieves the pressure created within the chamber 4, consequently that cylinder communicating with the port 6 which is opened to the chamber 4, will exhaust into the chamber 4 and also pass thru the by-pass ports 3, together with the pressure fluid supply and enter the return line.

The action of the valve has been described in connection with only one of the cylinder lines, due to the fact that the other port 6 is closed during the entire operation, which is duplicated in order to build up, maintain or exhaust the pressure therein.

While I have shown one specific form of my invention, which is adapted to control two pressure cylinders, it will be understood that the same can be adapted to any number of cylinders and various changes in details of construction are contemplated as within the claims.

I claim:

1. A valve comprising a casing having a fluid pressure inlet port, a fluid return port and an outlet port, means for selectively providing a communication between any or all of said ports, said means comprising a valve plate provided with openings adapted to selectively form communications between the desired ports, and a cut-off for controlling said openings, and yieldable means adapted to hold the cut off upon its seat against a predetermined pressure.

2. A valve comprising a casing having a fluid pressure inlet port, a fluid return port and an outlet port, a valve stem journaled in the casing and provided with a valve plate adapted to form communications between the desired ports, and a sleeve surrounding the valve stem and provided with a cut-off adapted to control the openings of the valve plate.

3. A valve comprising a casing having a fluid pressure inlet port, a fluid return port and an outlet port, a valve stem journaled in the casing and provided with a valve plate adapted to form communications between the desired ports, a sleeve surrounding the valve stem and provided with a cut-off adapted to control the openings of the valve plate, and yieldable means adapted to hold the cut-off upon its seat.

4. A valve comprising a pressure chamber and a relief chamber, a partition separating said chambers and having an opening normally communicating with each chamber and having a delivery port, a valve disk co-operating with said partition to control said ports and having a plurality of apertures therethrough adapted to independently align with either said opening or said port or to simultaneously align with both, and a cut-off adapted to cooperate with said valve disk to close any or all of the openings through said disk.

In testimony that I claim the foregoing I have hereunto set my hand at Milwaukee, in the county of Milwaukee and State of Wisconsin.

KARL O. NELSON.